US006647245B1

(12) United States Patent
Rosenbaum

(10) Patent No.: US 6,647,245 B1
(45) Date of Patent: Nov. 11, 2003

(54) SUBSIDIARY COMMUNICATION AUTHORIZATION (SCA) RADIO TURNER

(76) Inventor: Glen V Rosenbaum, 10601 S. Poinciana Rd., Gilbert, AZ (US) 85234

( * ) Notice: Subject to any disclaimer, the term of this patent is extended or adjusted under 35 U.S.C. 154(b) by 0 days.

(21) Appl. No.: 09/322,446

(22) Filed: May 28, 1999

(51) Int. Cl.[7] .......................... H04B 1/00; H04B 7/00; H04B 1/66

(52) U.S. Cl. ........................ 455/45; 455/205; 455/102

(58) Field of Search ........................ 455/45, 102, 260, 455/205, 302, 307, 308; 375/343, 326; 343/901; 381/2–4, 6, 14–16

(56) References Cited

U.S. PATENT DOCUMENTS 4,029,906 A * 6/1977 Takahashi
4,658,423 A * 4/1987 Nolde
5,193,213 A * 3/1993 Chon
5,212,491 A * 5/1993 Chin et al.
5,260,671 A * 11/1993 Iso et al.
RE34,540 E * 2/1994 Wu et al.
5,355,363 A * 10/1994 Takahashi et al.
5,428,610 A * 6/1995 Davis
5,581,576 A * 12/1996 Lanzetta et al.
5,950,118 A * 9/1999 Freeburg et al.
5,960,328 A * 9/1999 Kimura et al.
6,028,900 A * 2/2000 Taura et al.
6,081,697 A * 6/2000 Haartsen
6,111,613 A * 8/2000 Sasano et al.
6,195,534 B1 * 2/2001 Sakida et al.
6,310,578 B1 * 10/2001 Ying

FOREIGN PATENT DOCUMENTS

JP 406140954 A * 5/1994 ............ H04B/1/16

OTHER PUBLICATIONS

Miodrag Temerinac, Ph.D., VHF–FM Receiver Secondary Services, RDS to ARI Compatibility Topics. Ieee Transactions on Consumer Electronics vol. 36, No. 2, May 1990.*

* cited by examiner

*Primary Examiner*—Nguyen T. Vo
*Assistant Examiner*—Edan Orgad

(57) ABSTRACT

A complete process is described for demodulating subsidiary communications authorization (SCA) radio signals. This process takes as an input an FM radio signal from a commercial FM telescoping type antenna. The signal is optimally processed through filtering, amplification, and dual detection circuitry to provide a high quality sub-carrier audio signal. Special matching is provided to set the signal's gain, noise figure, and injected distortion levels as a function of the antenna being extended or collapsed. Also, filtering of RF image and IF baseband signals is uniquely and efficiently performed in a radio receiver having an telescoping antenna and audio out line, an SCA radio turner has a matching filter between the antenna and a first FM discriminator to match the level of extension of the antenna, a phase-lock-loop circuit within a second FM discriminator following the first FM discriminator, and sub-carrier audio processing between the FM discriminator and the audio out line. A filter for image rejection is included between the matching filter and the first FM discriminator. The first FM discriminator includes a local oscillator and mixer to convert the incoming RF signal to an IF signal at approximately 10.7 MHz and a square wave detection circuit to convert a main broadcast signal into an audio signal and a sub-carrier signal from a doubly modulated signal to a singly modulated signal.

5 Claims, 8 Drawing Sheets

SCA Tuner Block Diagram

SCA Tuner Block Diagram Fig. 1

Figure 2 SCA Tuner Schematic

Whip Antenna Impedance

| Antenna | (dB) S21 Gain | NF (dB) | (-dBm) IM(3)out (IP3=24dBm w RF in @-30dBm) |
|---|---|---|---|
| Extended | 19.6 | 4 | -79 |
| Collapsed | 8.9 | 9 | -111 |

Antenna Modeling Considerations

Image Frequency Considerations

Capacitive-Coupled Filter – Normal Form

Capacitive-Coupled Filter – with L/C Resonator

L/C Resonator Plot Example

$SL_1 = SL + 1/SC$ $CS^2(L_1 - L) = 1$ $C = 1/[S^2(L_1 - L)]$ $\omega_{02}^2 = 1/(LC)$ $C = 1/(L\omega_{02}^2)$ Eq. 2

Sub Equation 2 for C, & S for jω

$1/[\omega_{01}^2(L - L_1)] = 1/(L\omega_{02}^2)$ $\omega_{01}^2 L - \omega_{01}^2 L_1 = L\omega_{01}^2$ $L(\omega_{01}^2 - \omega_{02}^2) = L\omega_{01}^2$ $L = L_1\omega_{01}^2/(\omega_{01}^2 - \omega_{02}^2)$ Eq. 1

Impedance Transformation Derivation:

To Convert an Inductor to a Series L/C Resonance

SUBSIDIARY COMMUNICATION AUTHORIZATION (SCA) RADIO TURNER

BACKGROUND OF THE INVENTION

1. Field of the Invention

This invention relates generally to the field of radio turners and more specifically o the field of subsidiary communications authorization radio turners that provides high quality output of sub-carrier signals as used in the commercial FM band. The invention may also be applied wherever sub-carrier signals are used, such as with secondary-audio-product (SAP) audio from television broadcasters, or in main carrier signal detection, where especially high quality is needed.

2. Background Art

Commercial FM radio broadcasters each has just one main channel of programming available at its designated frequency. To allow more than one program to be simultaneously sent by the same radio station, the FCC has authorized sub-carriers to the same designated frequency. This allows secondary programming on the same signal. This programming is restricted in the United States such that normal commercial AM/FM radios can not decode this signal. The sub-carrier programs are typically targeted to ethnic, language, or other special interest type groups. The sub-carrier signal is generated by having the SCA audio programming frequency-modulate the sub-carrier, which is typically at 67 KHz or 92 kHz. The modulated signal is band-with limited to approximately 8–14 kHz. This signal is then attenuated approximately 20 dB and super-imposed to the main audio, which in turn frequency modulates the main carrier in the 88–108 MHz range. Part of the intent is that the SCA signal will not interfere with the main signal. More commonly, it is the main signal that degrades the sub-carrier. The sub-carrier is much smaller, more limited in band-with, imbedded inside a strong signal; and it goes through two modulation phases before transmission. This whole double modulation process makes the SCA signal much more challenging for the tuners in the decoding end.

Relevant technology is found in the use of commercial AM/FM radios with the addition of a second demodulator. Commonly, the tuner of a radio is used for the first demodulation phase. This base-band output of the radio's tuner produces the main program audio with the sub-carrier superimposed. This signal is then fed into an additional frequency discriminator which finally 'pulls out' the SCA audio programming.

Commercial FM radio tuners are inadequate to perform frequency demodulation needed for the first phase of high quality SCA reception. This is for several reasons. First the filter circuitry is not matched for optimum reception from the antenna at its optimum length for the exact frequency of reception needed. This is impractical for commercial radio tuners to do because they need to cover the whole FM band from 88 MHz to 108 MHz. They can only have a general or somewhat compromised match to the antenna. Even higher cost radio tuners are not designed optimally for a given station with a varying length antenna. Rather it is designed for an external antenna with fixed impedance of typically 50, 75, or 300 Ohms.

Second, the tuners have a much wider front-end filter bandwidth. This allows more signals to enter the first mixer, which introduces intermods and spurious signals. The intermods are normally smaller and not an issue for the main programming audio. But they can create havoc with the lower level sub-carrier. The injected intermods can commonly be equal to or greater than the sub-carrier signal, degrading its quality.

Third, commercial tuners do not have high image rejection because they usually don't need it for main carrier FM reception. Once an image frequency has 'folded' over to into the IF portion of the first mixer, filtering can not remove it, because it would remove the desired portion at the same frequency. The sub-carrier is inherently more susceptible to this type of interference because of its lower level.

This patent submission provides an SCA tuner with optimized matching to the antenna at a pre-determined station frequency for the optimum antenna length. This provides for optimum signal transfer into the first mixer with low noise figure. If the telescopic antenna is collapsed down for strong signal areas, the circuitry has deliberate filter impedance mismatching; which reduces the signal gain and provides needed lower inter-modulation products for higher performance. This tuner design also has an exceptionally narrow filtering band-width into the first mixer, also minimizing any spurious or intermod interference. Furthermore the SCA tuner has extremely high image rejection to prevent interference of that nature into the first mixer. The second demodulation phase of the tuner has specific SCA filtering with a very high Q and with low group delay. These circuits work together to minimize 'leakage' of the main signal programming into the subsidiary signal. This is a common problem other sca designs, missing the features here listed. These features work together to create the highest quality output possible of the subsidiary signal.

SUMMARY OF INVENTION

An object of the present invention is to provide a SCA tuner circuitry for more optimal matching of the radio antenna when extended or collapsed, and to handle both strong or weak signal conditions.

Another object of the invention is to provide for weak signal inputs, a more matched filtering for minimal noise figure and maximal gain, while for strong signal inputs minimum gain and $3^{rd}$ order intermodulation distortion products. A related object of the present invention is to engage unique filtering for RF image rejection having minimal impact to the required pass-band. The secondary demodulation phase of the tuner also rejects near-by interfering signals.

Another object of the present invention is to reduce main programming 'leakage' into the sub-carrier, yet minimize any 'image' signal fold-over interference, while filtering out undesired out-of-band RF signal inputs.

Yet another object of the present invention is to have sharp RF front-end filtering that can be tuned to any selected frequency of the FM radio band and have minimal group delay distortion in the filtering components, while providing unconditionally stable front-end amplification, for a variety of source antenna impedances.

Still yet another object of the present invention is to provide narrow-band filters in a versatile way to selectively notch out undesired frequencies on the low side, while minimally affecting the pass-band.

This invention comprises unique circuitry for demodulating a sub-carrier radio signal. It optimally matches a signal coming from a commercial FM telescopic antenna, adjusting for the antenna being extended or collapsed. If the antenna is extended (as needed in a low level signal area) the signal is introduced to the first mixer with a low noise figure and maximum gain. If the antenna is collapsed (as indicated for a strong signal area) the signal is amplified with less gain and the intermodulation distortion generated is significantly reduced. In both cases the signal is selectively filtered in a narrow band-width which introduces only a minimum amount of group delay distortion. Also this circuitry can be adjusted or tuned across the complete FM commercial band.

This invention also comprises unique filtering circuitry, which effectively eliminates image signals into the front end of the tuner. This is done through a conversion process of the band-pass filter, which leaves the pass-band essentially unaffected. Also the tuner has a second demodulation phase requiring filtering, which has been similarly converted to notch out undesired lower frequency elements. It also leaves the pass-band in tact, and maintains very low group delay, essential for good sub-carrier detection.

This invention is intended to provide best quality demodulation of a subsidiary signal using a portable FM radio with a telescopic whip type antenna. To this end the following specific objectives are needed and realized in a unique producible fashion.

In accordance with a preferred embodiment of the present invention, in a radio receiver having an telescoping antenna and audio out line, an SCA radio turner comprises a matching filter between the antenna and a first FM discriminator to match the level of extension of the antenna; a phase-lock-loop circuit within a second FM discriminator following the first FM discriminator; and sub-carrier audio processing between the FM discriminator and the audio out line.

Other objects and advantages of the present invention will become apparent from the following descriptions, taken in connection with the accompanying drawings, wherein, by way of illustration and example, an embodiment of the present invention is disclosed.

BRIEF DESCRIPTION OF DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in-virtually any appropriately detailed system, structure or manner.

Figure 1:
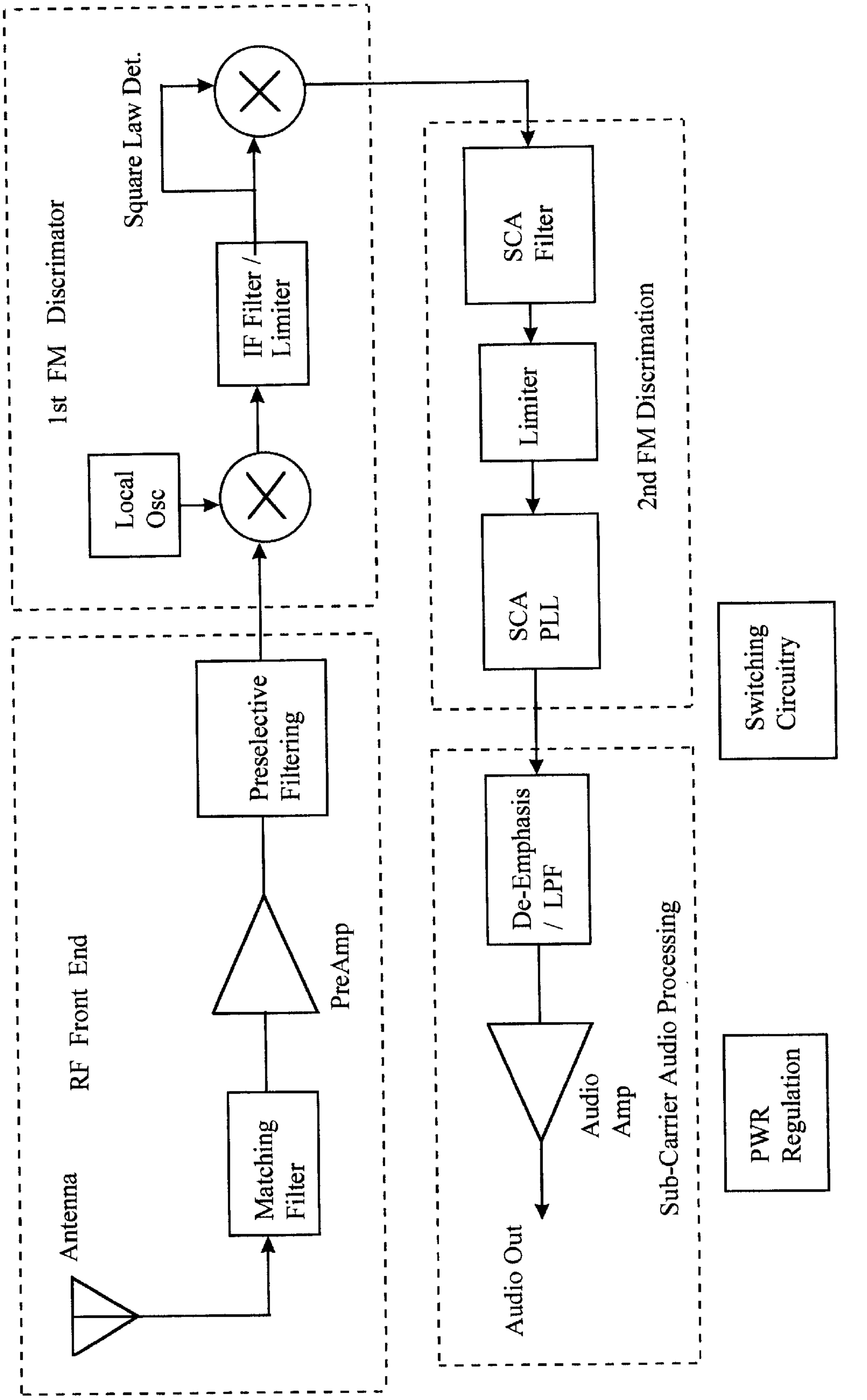
FIG. 1 is a systems level block diagram of the sub-carrier tuner in accordance with a preferred embodiment of the present invention.

The system overview of FIG. 1 depicts the blocks of circuitry that comprise the SCA Tuner. In the RF Front End portion of this diagram, a signal is received at the antenna from a broadcasting site. The signal is optimally matched and absorbed into the filtering and pre-amplification portion of the circuitry, depending on the extension of the antenna. The tuner conditions this signal for the first FM discriminator with matched filtering, pre-amplification, and narrow-band filtering. Image rejection is also performed in the pre-selective filtering stage.

In the $1^{st}$ FM Discriminator block of the diagram, the RF signal is converted into an IF signal at 10.7 MHz, via a local oscillator and a mixer. After amplification and limiting, the signal is square-law detected. This detection provides the first demodulation phase. It converts the main broadcast signal into audio; and the sub-carrier signal is converted from being doubly modulated to just singly so, back to its actual sub-carrier usually at 67 or 92 kHz.

The $2^{nd}$ FM Discrimination block depicts the SCA signal being filtered and limited. The signal then goes through a second and final detection step, via a phase-locked-loop (PLL). The sub-carrier is here converted from an IF to a base-band signal, usually audio.

The final audio is processed as shown in the Sub-Carrier Audio Broadcasting block. Because the broadcaster (to help reduce noise) added pre-emphasis to the audio signal that was transmitted, de-emphasis filtering is provided after the PLL. Then the sub-carrier audio signal is amplified, and ready to be listened to through speakers, or processed in any other way needed.

The 'PWR Regulation' block shown in FIG. 1 represents DC voltage regulation that the other blocks need for power.

The 'Switching Circuitry' block represents the means to switch the SCA audio signal to its destination, typically speakers. It also represents the switching circuitry to turn off nearby electronic circuitry which could interfere with good SCA reception (for example a local oscillator running some other circuit).

Figure 2:
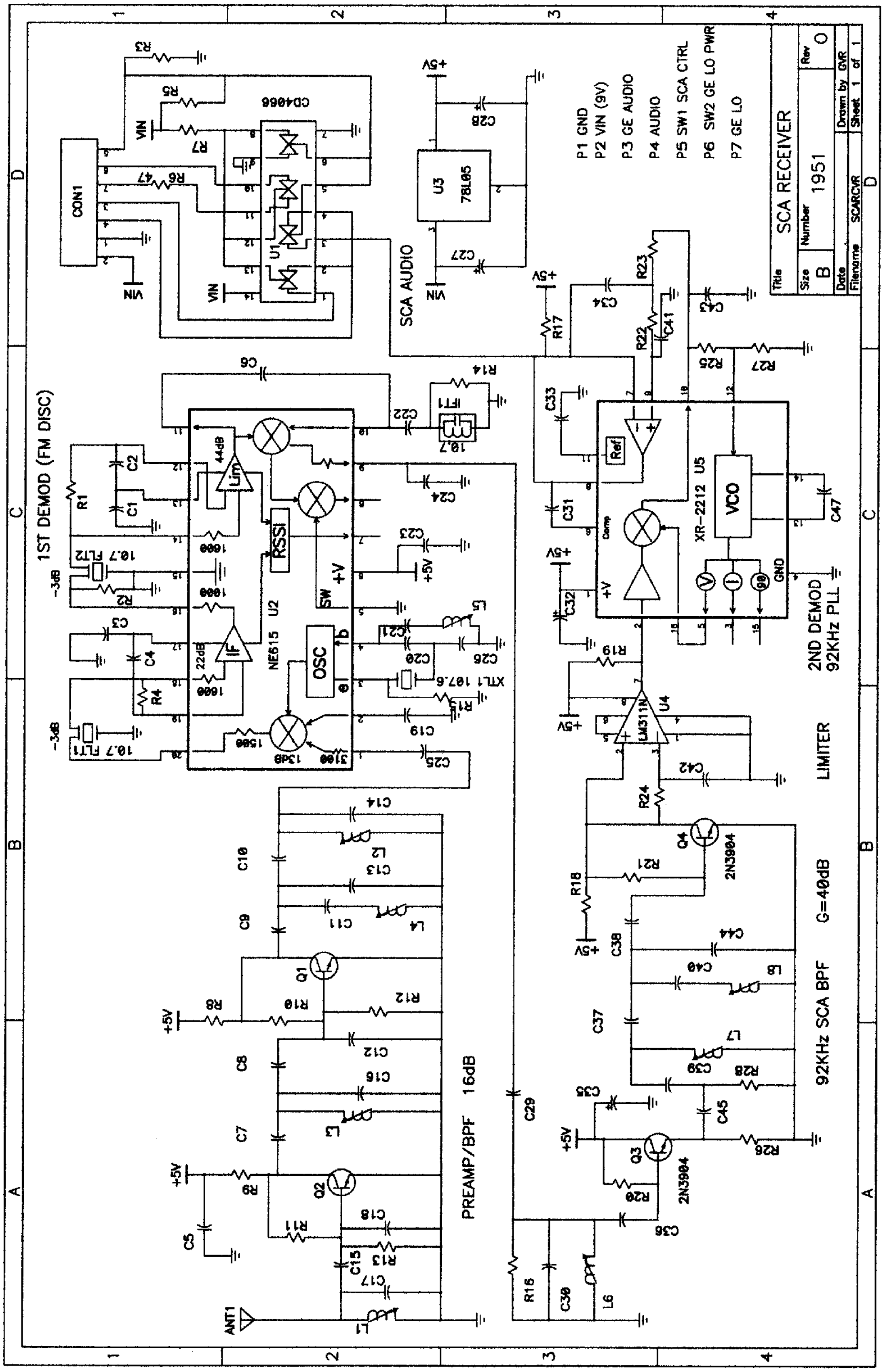
FIG. 2 is a schematic implementation of the sub-carrier tuner in accordance with a preferred embodiment of the present invention.

A detailed implementation of the system block diagram is shown in FIG. 2. This is a schematic of a tuner for the FM (88–108) commercial band. Its purpose is to crystal lock to a pre-specified radio station to the $1^{st}$ IF and then to phase-lock and decode the 92 kHz sub-carrier that the broadcaster is transmitting. The tuner adjusts the received signal from being either very weak or strong at the antenna input, adding different characteristics as respectively needed. These characteristics will be explained.

FIG. 2 shows the signal going from the antenna into the PREAMP/BPF circuitry. The RF input is provided by the antenna. The antenna discussed here is the telescopic type used on common commercial FM radios. A suitable antenna extends 36 inches, and collapses to about 6 inches. The antenna may be considered as a source generator. As such it will have a source impedance. This is actually a complex source impedance with real and imaginary (j) components. In other words, the impedance will have a positive or negative reactance associated with its real component. These complex source impedances vary as a function of antenna length; as well as of the wavelength of the signal coming in. It is expected that if the signal is weak, that the antenna will be extended for maximum reception. Maximum transfer of the energy from the antenna then requires a complex conjugate match to the source impedance of the antenna source. This is also coupled with the need to provide significant band-pass filtering, at a low insertion loss, especially in the front-end part of RF circuitry. More detail will be given about the antenna source and matching is characteristics in other figures to be described.

The complex matching and beginnings of band-pass filtering are shown by the components leading to the antenna, specifically L1, C17, and C15. L1 and C17 provide a resonant band-pass. At the signal's RF frequency, the tank circuit has a high impedance, and is essentially transparent to the signal going in. However, any large out-of-band signals are caught here and prevented from going into the first active amplifier (Q2) stage, where they might saturate or damage the tuner.

The reactance part of the complex conjugate load impedance for the antenna, is primarily provided by C15. This small amount of negative reactance cancels the. positive source reactance (to be shown) that the extended antenna provides. This is part of the requirement for maximum transfer of energy of the signal, and results in maximum gain. In the other case, when the antenna is collapsed, its reactance is negative which causes an impedance mismatch with C15. This reduces the gain, as desired.

Complex matching for maximum power transfer calls for both the real and the reactance components of the impedance to be matched. The RF energy gets transformed going through the reactive (capacitive and inductive) elements. But it is the real component of the load impedance that the energy is actually dissipated into. The 'real' part of the complex matching impedance is intended as much as possible to be the input to the active device (Q2). It is desired that the signal be absorbed there of course, because that is what will be amplified and sent on to the rest of the circuitry. The dc biasing resistor R13 will absorb some of the signal's energy. However at 560 Ω, power loss is minimal considering (as will be shown) that the antenna source impedance is much lower at ~133 Ω. Although not normally a production issue that would justify the trouble, in a critical situation an RF choke (not shown) could be put in series with the R13 resistor, to prevent any loss of the RF energy through that path.

Resistors R11 and R9 also provide part of the dc biasing with R13. But more importantly, they provide negative feedback. This feedback with the rest of the biasing sets the input of active Q2 device to the optimum real component of the complex conjugate matching. This provides maximum power transfer of the signal from the antenna. These resistors also provide dc stability to help prevent thermal runaway; and additionally, ac stability. Feedback also sets the gain as a function of the resistor values, rather than the transistor itself, which will vary in production lots.

Having provided optimum transfer of the RF energy for an extended antenna, and creating a deliberate mismatch for a collapsed condition, noise figure must be considered. For an extended antenna, minimum noise figure is needed. It is senseless to have lots of transferred RF energy, if considerable noise is injected in the process. The signal-to-noise needs to be maximized. This of course is set by the front-end of the RF tuner circuitry being discussed.

Noise figure for discrete active devices such as Q2 is primarily set by device's collector current and source impedance. The collector current also affects the power output and gain. But more importantly for SCA tuner considerations in strong signal conditions, the inter-modulation intercept point needs to be high, which is also directly affected by the current. Collector current is chosen to be 20 mA for IP(3)=+24 dBm (low inter-modulation distortion), balanced with minimal noise figure degradation which is generally optimum at lower currents. C18 is the primary component to provide the optimum source impedance needed for minimum noise figure.

Heavier pre-selective filtering is provided by the capacitors and inductors between the active transistor components Q2 and Q1. The filtering is a capacitive-coupled type, modified to provide real world impedance matching between the two transistors. This is done by transposing part of the parallel resonant elements to series capacitance elements. This also has the effect of lowering the input and output impedances, which is usually desirable for narrow-band configurations such as this.

A similar filter is shown by the components between the Q1 active device and the first mixer inside U2. However, this filter has been uniquely converted. Besides providing the Q2 to Q1 band-pass filtering effects just described, it also deeply notches out the undesirable image frequency, on the low end. Related figures and detail will follow. This is primarily accomplished by the L4 and C11 components.

The components including the antenna, and between it and the mixer comprise the RF Front-End portion of the circuitry (labeled: PREAMP/BPF). This arrangement of components sets critical RF performance parameters for the SCA tuner. For the components listed, if the antenna is extended, noise figure is 4 dB or better with a gain of almost 20 dB. This is important for weak signal conditions, because the sub-carrier is already about 20 dB less than the main carrier. Normally man-made, atmospheric, and transmitted noise at these frequencies is high enough to invalidate the need for much lower NF.

Figure 4:
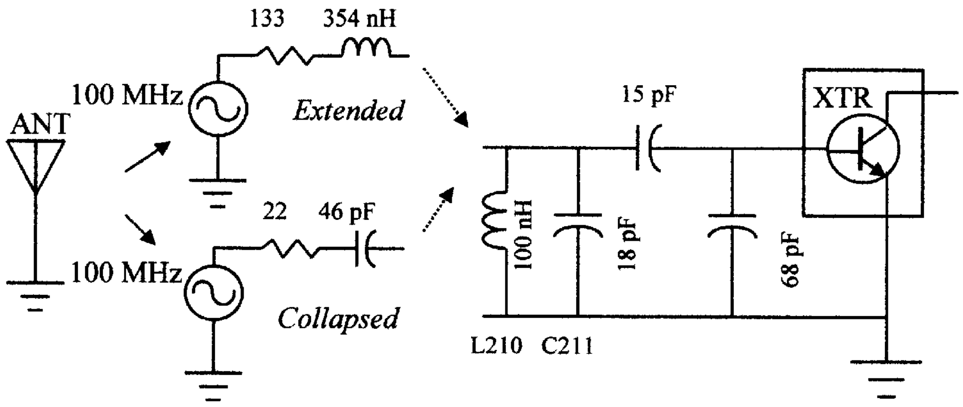
FIG. 4 shows antenna modeling considerations for the antenna extended or collapsed.

If the antenna is collapsed, the gain decreases to less than 9 dB and the inter-modulation distortion elements decrease 30 dB (conditions listed in FIG. 4). Both these changes are important where the signal may be strong, because in the FM commercial band there will be other strong signal combinations where third order intermodulation products can mix and be generated in the same RF bands. Because the SCA is already 20 dB down from the main carrier, the intermods can more easily be at the same power (and frequency) level causing significant interference. A 10 dB drop in gain will reduce a $3^{rd}$ order intermod by 30 dB, because of its third order nature, which is caused by the non-linear junctions of semiconductors. This is why the gain needs to be reduced as soon as possible, especially before the RF signal enters the input U2 IC device which has an IP(3)=−10 dBm. Reducing gain is important for strong signal conditions.

Another important factor to reduce intermods and other types of interference, is the very narrow-band filtering (1.2 MHz bandwidth). This filtering is in place for both conditions of the antenna being extended or collapsed. It has less than 3 ns of group delay. An important feature is that it is adjustable across the (88–108) MHz band. In addition, the filtering also provides unique image rejection needed prior to the first mixer.

The '$1^{st}$ DEMOD (FM DISC)' portion of the schematic in FIG. 2 depicts the first demodulation of the radio signal. This takes advantage of a multi-function communications chip such as U2. Peripheral components are added to complement the circuit. The functions are a Local Oscillator, Mixer, IF Filtering, Limiting, and Square Law Detection.

The Local Oscillator (LO) is generated as a Butler overtone series mode configuration. This is crystal (XTL1)

locked usually at the third overtone. There is also a tunable inductor (L5) to exactly adjust the frequency. R15 provides additional current biasing for the oscillator to work at higher frequencies. C26 and C20 are part of the tank resonance, and C21 provides an ac bypass for the inductor.

The RF signal mixes with the LO to produce an intermediate signal (IF) at 10.7 MHz. This signal is amplified; and limited as shown, and put through two external 10.7 MHz ceramic filters (FLT1 and FLT1). These filters are specially cut for low (250 ns) group delay. The IF signal is then square law detected with the assistance of the IFT1 10.7 MHz resonator and caps C6 and C22. IFT1 is tunable for optimum response at 10.7 MHz. R14 limits the quality (Q) of the resonator to insure that detection will be linear.

This produces the radio station's main audio signal (which is not used) and the SCA signal, which has gone from being doubly modulated at RF, to singly modulated at IF. It could be at 67 KHz, 92 KHz or other frequencies. This schematic portrays the 92 kHz scenario.

The SCA IF is filtered in the '92 KHz SCA BPF' portion of the schematic. Q3 is used as a high impedance load of the first tank circuit of R16, C30, and L6. It also serves as an emitter driver (to provide a low impedance) for the second part of the SCA filtering. This filter is a much lower frequency than others described, centered near 92 kHz. Its bandwidth is 9.2 kHz from (87.2–96.4) kHz, with considerable gain near 40 dB. The filter is symmetric at its −3 dB points, but rolls off much more quickly on its low end. As described before for the RF filtering, one of the inductors for this IF filter has been replaced with resonant L/C components L8 and C40. These have a sharp root-locus pole near the low end of the pass-band, such that at 73 kHz the filter rolls off −63 dB. This is to remove signals near-by that may interfere with optimum operation, and could be locked onto by the PLL (to be described). This filter also has low group delay 33 us, (low in comparison to a 92 kHz wavelength).

The filtered 92 kHz SCA signal then goes through a limiter U4. This is to remove amplitude modulation (AM), commonly seen on the signal at this point due to the effects of the main carrier in the first demodulation. The AM could degrade the final detection process.

The limited signal is then input to the phase-locked-loop. The PLL is comprised primarily of an integrated package (U5) with peripheral components. C47 and R27 set up the 92 kHz VCO operation. Loop filtering is primarily provided by R25 and C43. The PLL detection has extremely good detection (i.e. voltage detected Vs frequency) at or better than 1% over the +/−6 kHz sweep range of the SCA modulated signal. Its damping coefficient is 0.7, and loop filter bandwidth is 13 kHz.

The SCA detected signal is now at base-band, ready for de-emphasis. This is done by R22, R23, and C41. This is set at 150 us as required commonly for SCA signals. It sometimes may need to be different. (Main signals are commonly set with 75 us pre and post emphasis). C34 is added to the components just listed, to provide a two-pole, unity gain, active low- pass filter. The second pole begins to-roll off from the de-emphasis curve at 7 kHz. The op-amp configuration also provides a low impedance output for the audio; and close to 1 Vpp signal, compatible with most speaker driver circuits.

The final SCA audio is routed through the switching circuitry by U1 to speaker driver circuitry. Voltage regulation for the circuits described is provided by U3.

Figure 3:
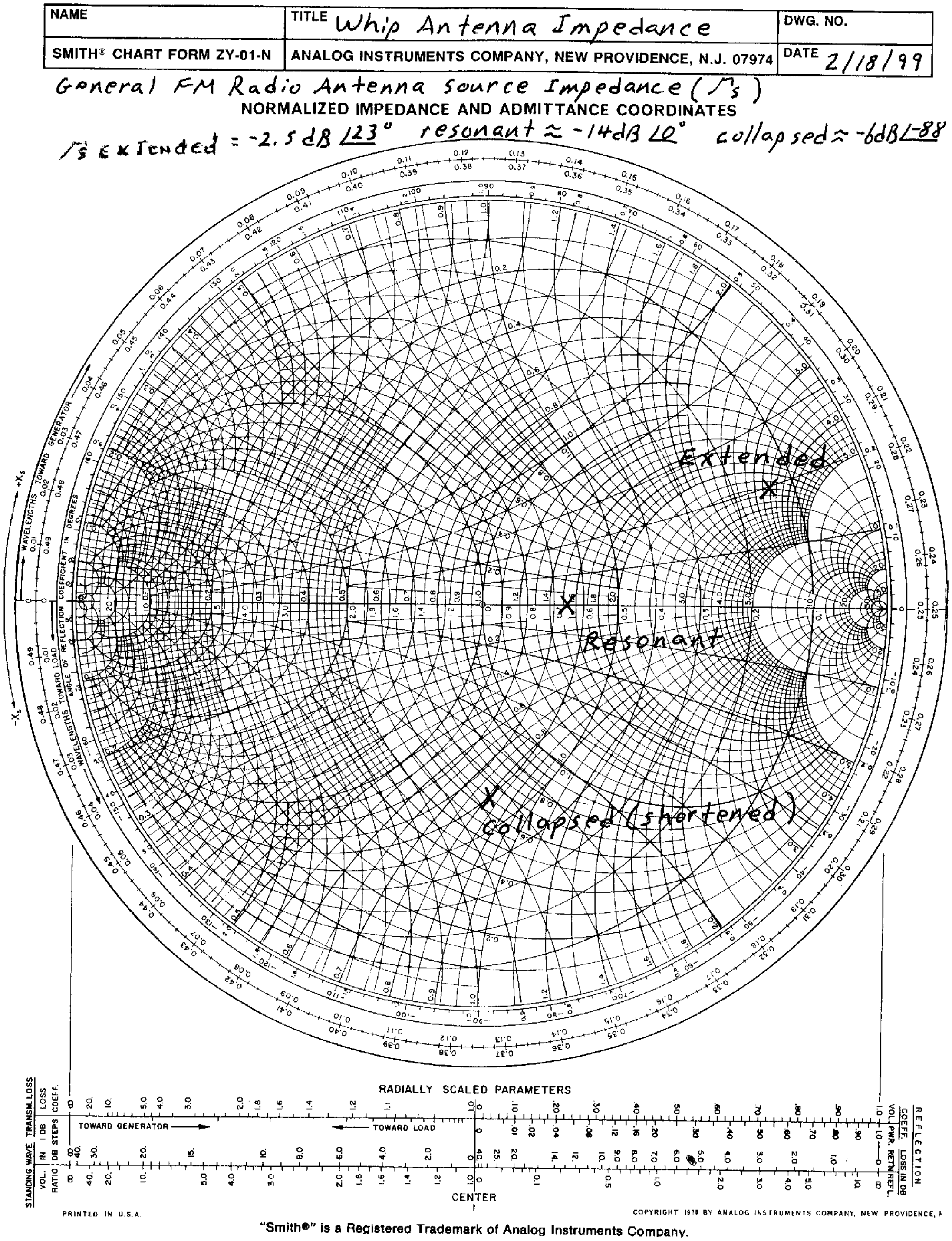
FIG. 3 is a Smith Chart representation of an FM radio antenna source impedance at a resonant, extended and collapsed or shortened position

The Smith Chart of FIG. 3 depicts the general source impedance of a telescopic antenna as commonly found on FM commercial radios for the 88–108 MHz band. This data comes from reflection coefficients, Γs shown on the chart, carefully and extensively measured with a network analyzer. When the antenna is a quarter wavelength it presents a 'real' impedance, with no reactance. When the antenna is shortened it adds a negative (capacitance type) reactance to the impedance as shown.

When the antenna is extended beyond resonance, its source impedance adds a positive (inductive type) reactance to the real component of the impedance (also shown on the chart). These values of course vary, on the exact length of the antenna, and also because the signal path to ground varies, which also affects the resonant path and resultant impedance.

FIG. 4 takes the information from the Smith Chart and shows a schematic representation of the telescopic antenna, as an AC voltage source with a complex impedance. This is shown as an inductor with a resistor for the extended case, and a capacitor and smaller resistance for the collapsed case. The extended case is for the situation of the radio receiver being in a weak signal area, such that the operator fully extends the antenna. Extended beyond the resonant point, the antenna will have a positive inductive reactance as shown. L210 and C211 are tuned to the same resonant frequency as that coming in through the antenna (in this case 100 MHz). The 15 pF and associated reactances with the XTR device supply a conjugate to the positive reactance of the antenna. The XTR also supplies a matching real impedance component to that of the antenna. As described previously, this provides maximum transfer of the signal power from the antenna to the active amplifier device. Also as described, the 68 pF is used for providing optimum source impedance to the active device for minimum noise figure, an equally important consideration. These two areas work together for optimal signal processing by providing maximum gain and minimum noise figure.

The table of FIG. 4 shows the significant changes in NF, Signal Gain, and Inter-modulation distortion as a function of matching to the antenna in an extended vs. collapsed case. In the extended case, the gain is high and the noise figure is low, which is desirable in a weak signal area. In the collapsed case, there is deliberate impedance mismatching. This reduces gain, which in turn significantly reduces inter-modulation distortion, which is desired in the strong signal condition.

Figure 5:
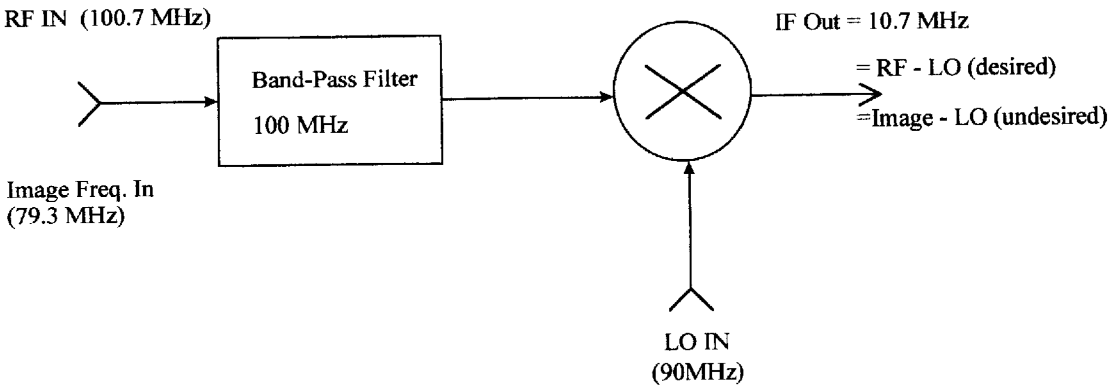
FIG. 5 is a block diagram depicting Image Frequency Considerations.

FIG. 5 defines 'image' frequency into the tuner mixer, by an example. It is shown that the RF In frequency will mix with the local oscillator to provide an intermediate frequency of 10.7 MHz. It is also shown that the lower 'image' will mix with the LO into the same IF, unless the filter is present. This is especially critical to the SCA tuner, because of the SCA signal being at a smaller level and more easily interfered with.

Figure 6A:
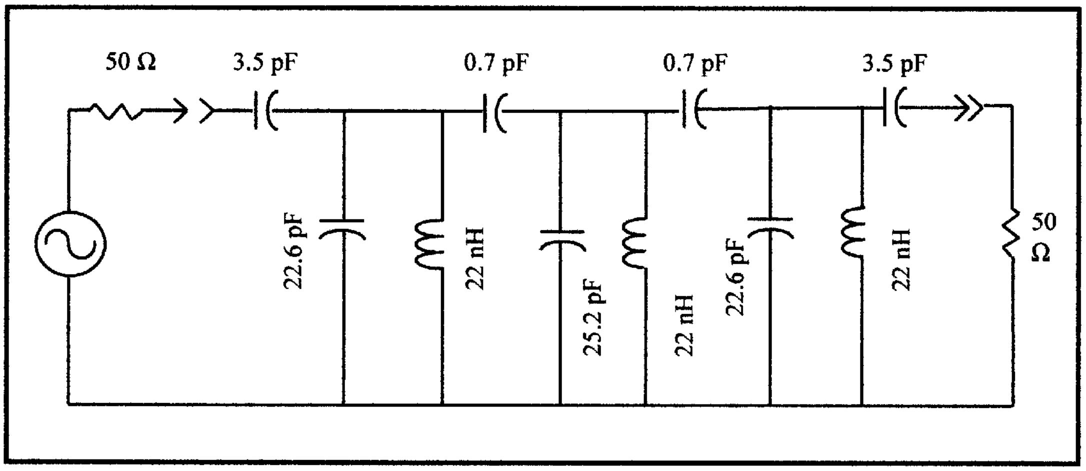
FIG. 6A is a schematic representation of a band-pass filter in a normal capacitive-coupled form.
Figure 6B:
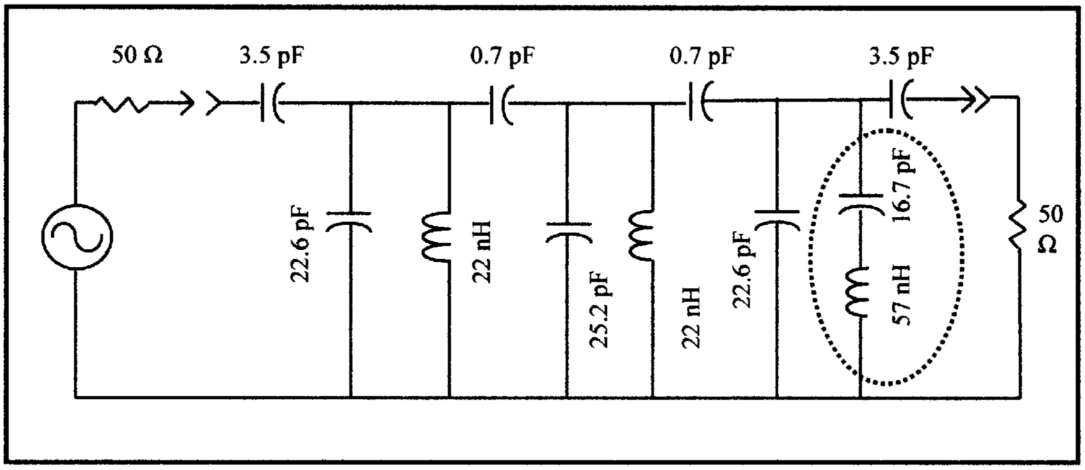
FIG. 6B is a schematic representation of a band-pass filter in capacitive-coupled form converted with an L/C resonator.
Figure 7:
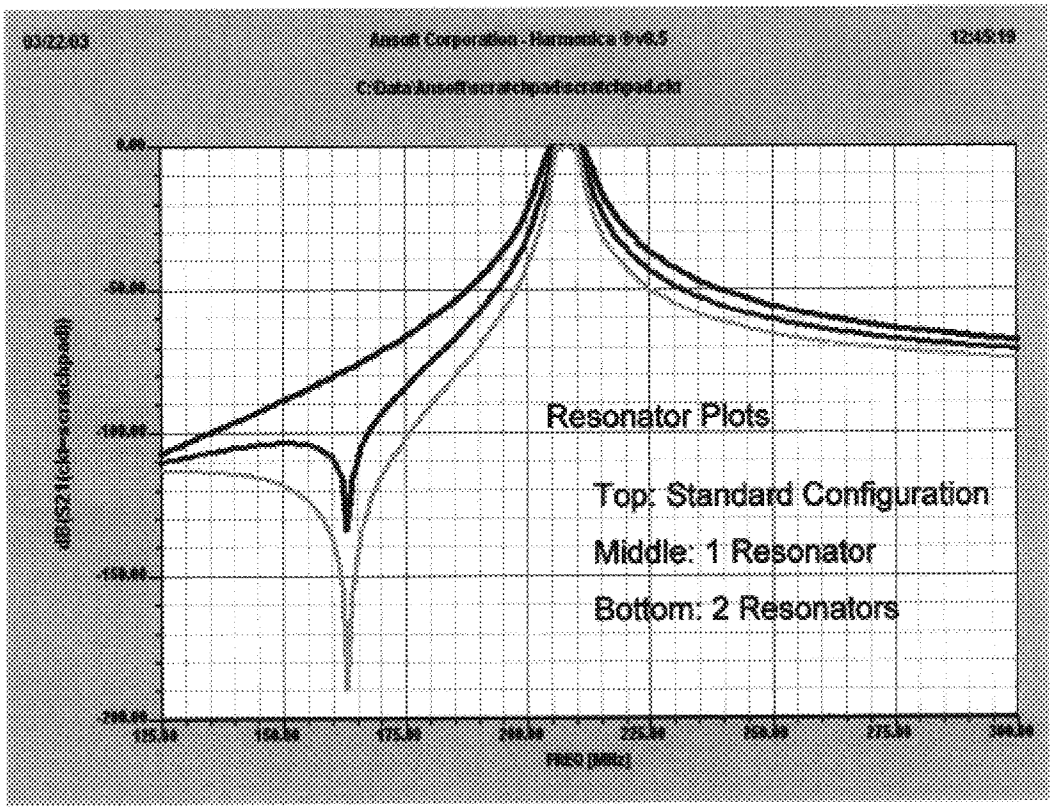
FIG. 7 shows band-pass filter L/C Resonator Plot example.
Figure 8:
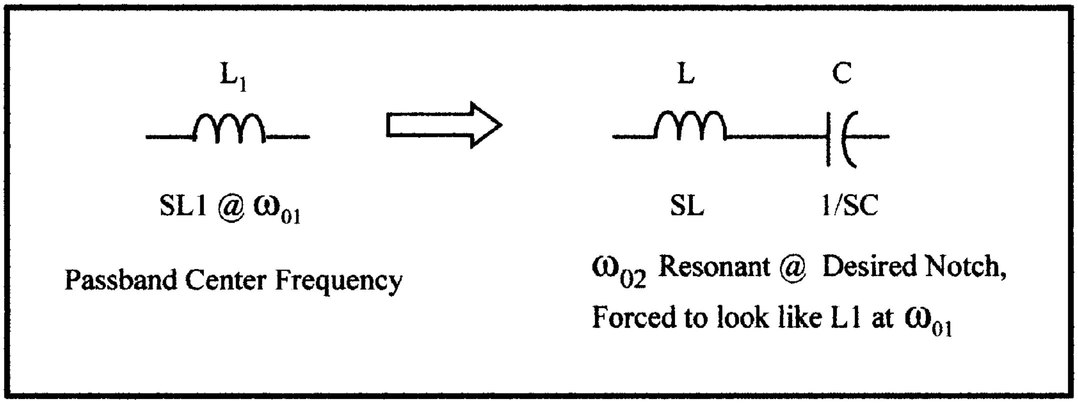
FIG. 8 shows a diagram and derivation showing how to convert an inductor to a series L/C resonance.

The ability to notch out the image frequency, and other frequencies as well, is shown in the last FIGS. 6, 7, and 8. An example of the process is shown, which is applied to the image rejection as well as the in the SCA IF filtering discussed previously. This process works by transposing elements in narrow band-pass configuration. It can apply a notch at any desired frequency, on the low end of the filter pass-band.

FIG. 6A shows a capacitive-coupled filter in a 50 Ω system. This is a narrow band-pass configuration with a center frequency of 208 MHz. It has 0.1 dB ripple inside a pass-band of 6 MHz. The right side 22 nH inductor is changed to an L/C network in FIG. 6B. These circled components (the inductor and capacitor) add a resonant pole, that is a notch 45 MHz below the center frequency at 197.3 MHz.

FIG. 7 shows the plots of the filter in its standard configuration, and with one or two resonators. Note how deeply the resonators notch out any signal at their resonant poles. Also observe the minimal affect on the pass-band area of the filter.

FIG. 8 shows the derivation for the conversion process. This is done using Laplacian transforms, and then; converting the 's' notation to jω format. Note that ω01 is the pass-band center frequency of the filter; and ω02 is the desired notch frequency. The derivation leads to Equations 1 and 2 that will convert the original inductor to an L/C resonator. This works because the new resonator has an equivalent reactance at the center pass-band frequency as the original inductor.

In this conversion process, the resonant inductor value is larger than the single inductor it replaces. This works out well, because in especially narrow pass-band situations, small inductor (i.e. reactance) values are required. These are sometime not practical in value or convenient. But replacing the inductor with an L/C resonator allows (in fact requires) a larger value inductor. This can be set at the inductance desired; and the resonant notch frequency can also be independently fixed, by varying the series capacitor.

As introduced here, this conversion process can especially knock out undesired frequency bands; and if the notch is set close into the pass-band, the low end frequency roll-off is particularly steep. The pass-band itself, if the L/C resonator is designed with a high Q, will not be affected by the resonator, because at the center frequency, the resonator looks electrically just like the inductor it replaced. Its resonance only comes into play below the pass-band. It should be noted that the band-width of the notch is proportional to the L/C ratio, the impedance loading, and the number of resonators used. As earlier described, the SCA Tuner applied this conversion for RF filtering for image rejection; Also it is used in the IF filtering of the SCA.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A receiver system for demodulation of a subsidiary carrier authorization (SCA) signal in the FM (88–108 MHz) radio broadcast band, comprising:

a matched filter between an antenna and a first FM discriminator, which provides optimum noise figure and signal gain in the antenna's extended position for weak RF signals; and conversely provides optimum inter-modulation rejection in the antenna's shortened position;

a first FM discrimination circuit provided by local oscillator mixing, IF signal limiting and amplification, and narrow-band square law detection, a second FM discrimination circuit required to extract the SCA signal, provided by filtering, amplitude modulation limiting, and a phase-lock-loops, sub-carrier audio processing between the second FM discriminator and an audio output line, providing filtering, de-emphasis, buffering and amplification.

2. An SCA receiver system according to claim 1 further comprising:

a filter for image rejection between the matching filter and the first FM discriminator.

3. An SCA receiver system according to claim 1 wherein the first FM discriminator comprises:

a local oscillator and mixer which converts the radio frequency (RF) signal from the antenna to an intermediate frequency (IF) signal at approximately 10.7 MHz.

4. An SCA receiver system according to claim 1 wherein the first FM discriminator further comprises:

a square law detection circuit to convert a main broadcast signal into an audio signal and a sub-carrier signal (i.e. to go from a double frequency modulated RF-SCA signal, to a single frequency modulated IF-SCA signal).

5. An SCA receiver system according to claim 1 which further comprises:

Filtering of the singly FM modulated IF-SCA signal prior to the 2nd discriminator which provides deep notching of the main band audio signal adjacent to the SCA signal, to prevent interference and allow for more linear discrimination of the sca signal.

* * * * *

UNITED STATES PATENT AND TRADEMARK OFFICE

CERTIFICATE OF CORRECTION

PATENT NO. : 6,647,245 B1
DATED : November 11, 2003
INVENTOR(S) : Glen V. Rosenbaum It is certified that error appears in the above-identified patent and that said Letters Patent is hereby corrected as shown below:

Title page, Item [54] and Column 1, lines 1 and 2,
Title, should read:
-- SUBSIDIARY COMMUNICATION AUTHORIZATION (SCA) RADIO TUNER --

Signed and Sealed this

Second Day of March, 2004

JON W. DUDAS
*Acting Director of the United States Patent and Trademark Office*